United States Patent
Elserougi et al.

(10) Patent No.: US 10,644,596 B2
(45) Date of Patent: May 5, 2020

(54) SELF-BALANCED NON-ISOLATED HYBRID MODULAR DC-DC CONVERTER BASED ON LOW DUTY CYCLE OPERATION AND SEQUENTIAL CAPACITORS CHARGING/DISCHARGING FOR MEDIUM VOLTAGE DC GRIDS

(71) Applicant: Qatar University, Doha (QA)

(72) Inventors: Ahmed Elserougi, Doha (QA); Ahmed Massoud, Doha (QA); Shehab Ahmed, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/207,121

(22) Filed: Dec. 1, 2018

(65) Prior Publication Data
US 2019/0267898 A1    Aug. 29, 2019

Related U.S. Application Data

(60) Provisional application No. 62/593,473, filed on Dec. 1, 2017.

(51) Int. Cl.
*H02M 3/158*    (2006.01)
*H02M 3/156*    (2006.01)
*H02M 3/157*    (2006.01)

(52) U.S. Cl.
CPC .......... *H02M 3/158* (2013.01); *H02M 3/156* (2013.01); *H02M 3/157* (2013.01)

(58) Field of Classification Search
CPC ....... H02M 3/155–158; H02M 3/1584; H02M 3/1588; G05F 1/46; G05F 1/462; G05F 1/577; Y02B 70/1466
USPC .................................................. 323/270–272
See application file for complete search history.

(56) References Cited

U.S. PATENT DOCUMENTS

| | | | | |
|---|---|---|---|---|
| 2004/0041543 A1* | 3/2004 | Brooks | ............... | H02M 3/1584 323/212 |
| 2010/0019753 A1* | 1/2010 | Ikeda | .................... | H02M 3/158 323/311 |
| 2014/0159681 A1* | 6/2014 | Oraw | ..................... | H02J 1/102 323/271 |
| 2015/0035371 A1* | 2/2015 | Ahmed | .................. | H02J 3/382 307/78 |
| 2016/0248247 A1* | 8/2016 | Origane | .................... | H02J 1/08 |

* cited by examiner

*Primary Examiner* — Yemane Mehari
(74) *Attorney, Agent, or Firm* — Squire Patton Boggs (US) LLP (57) ABSTRACT

An electrical converter is provided, comprising a first half-bridge sub-module, a switch, and a first capacitor. The half-bridge sub-module is connected to the first capacitor, and the switch is connected to a terminal of the first half-bridge sub-module. The switch includes a plurality of insulated-gate bipolar transistors. The insulated-gate bipolar transistors are serially connected with each other.

17 Claims, 8 Drawing Sheets

SELF-BALANCED NON-ISOLATED HYBRID MODULAR DC-DC CONVERTER BASED ON LOW DUTY CYCLE OPERATION AND SEQUENTIAL CAPACITORS CHARGING/DISCHARGING FOR MEDIUM VOLTAGE DC GRIDS

CROSS REFERENCE TO RELATED APPLICATION

This application claims the benefit of priority from U.S. Provisional Application No. 62/593,473 filed Dec. 1, 2017.

BACKGROUND

High power direct current (DC)-DC converters are one of the main components in medium- to high-voltage DC grids, which are used to connect two different DC voltage levels. DC-DC converters can be classified into isolated and non-isolated. In isolated DC-DC converters, dual active, bridge-based DC-DC converters are the most common isolated DC-DC converter. In the case of high-voltage (HV) levels, switches with HV ratings are required, which necessitates using series-connected insulated gate bipolar transistors (IGBTs) to meet HV level requirements. Alternatively, multi-module DC-DC converters can be employed, but not without insulation challenges.

SUMMARY

According to one non-limiting aspect of the present disclosure, an example embodiment of an electrical converter may include a half-bridge sub-module, a switch, and a capacitor. The half-bridge sub-module may be connected to the capacitor, and the switch may be connected to a terminal of the half-bridge sub-module. The electrical converter may be a self-balanced, bidirectional hybrid modular non-isolated DC-DC converter.

Additional features and advantages are described herein, and will be apparent from the following Detailed Description and the Figures.

BRIEF DESCRIPTION OF THE DRAWINGS

For a proper understanding of this disclosure, reference should be made to the accompanying drawings, wherein.

DETAILED DESCRIPTION

The present disclosure describes various embodiments of a self-balanced, bidirectional, hybrid modular non-isolated DC-DC converter. In some embodiments, the self-balanced, bidirectional, hybrid modular non-isolated DC-DC converter may include half-bridge sub-modules (HB-SMs) and an HV switch. The HV switch may be implemented by a series connection of IGBTs having proper voltage sharing. The DC-DC converter may be operated with high conversion ratios. Based on the ratio of the voltages between the LV side ($V_{dcL}$) and the HV side ($V_{dcH}$), the number of HB-SMs (n) may be estimated where $n>V_{dcH}/V_{dcL}$.

In some embodiments, the proposed circuit may be considered a BC fed from the HV side. The BC may be operated with a low duty cycle, which may guarantee an efficient operation of the BC. During a turn-on period of the BC switch, the HB-SMs may be connected sequentially to the LV side. Based on the voltage level of the HB-SMs' capacitors and the voltage of the LV side, the power flow direction may be determined. Then, during a turn-off period of the BC switch, the LV side may be bypassed, while the HB-SMs' capacitors may be connected in series across the BC switch. Based on the total voltage of HB-SMs' capacitors, the power flow direction may be determined. The power flow control may be achieved by controlling a BC duty cycle through employing a simple proportional integral (PI) closed loop controller on the current at the HV side. The self-balanced bidirectional hybrid modular non-isolated DC-DC converter may provide self-balancing for HB-SMs' capacitors due to the sequential charging/discharging of HB-SMs' capacitors (i.e., sensorless voltage balancing techniques), operation with high conversion ratios, operating the BC with low duty cycles, which may ensure efficient operation, and bi-directional power flows.

In certain embodiments, the self-balancing, bidirectional, hybrid modular non-isolated DC-DC converter may be used for medium- to high-voltage, high-power applications. The configuration of the converter may provide a proper connection channel between two DC-link voltages with different voltage levels (i.e., low and high DC voltages, namely, $V_{dcL}$ and $V_{dcH}$, respectively).

Figure 1:
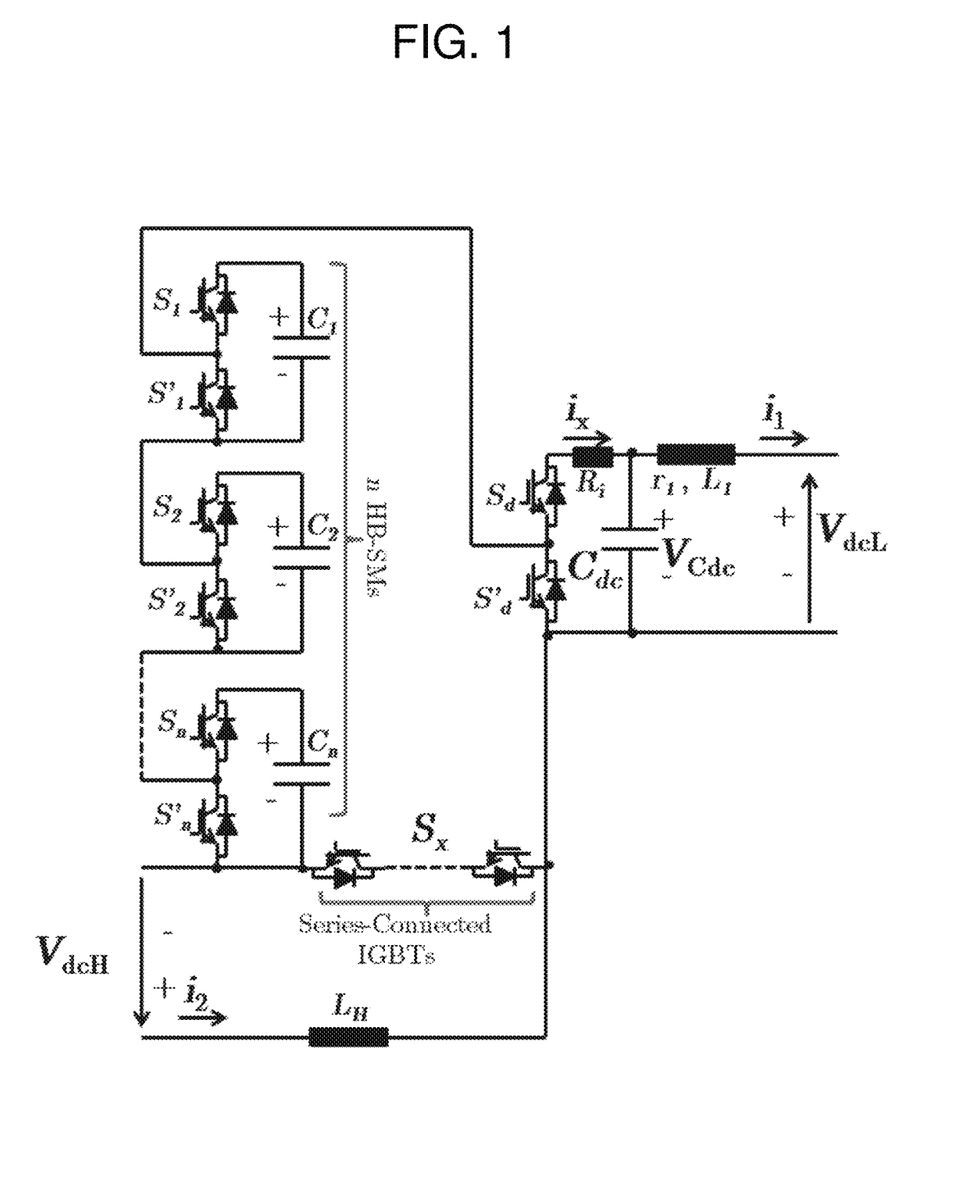
FIG. 1 is a schematic illustration of a non-limiting example of a structure of the electrical converter according to some embodiments.

FIG. 1 illustrates a structure of the self-balancing, bidirectional, hybrid modular non-isolated DC-DC converter. The converter may include n cascaded HB-SMs, where $V_{dcH}<nV_{dcL}$. In some embodiments, the HB-SM may be connected to a capacitance $C_{dc}$ through a limiting resistance $R_i$, and an HV switch $S_x$ rated at a voltage level higher than $V_{dcH}$, while the involved HB-SMs may be rated at a voltage level higher than $V_{dcL}$, and their capacitors may be pre-charged with the LV level $V_{dcL}$. In order to meet the HV rating of the switch $S_x$, series-connected IGBTs may be employed with proper voltage sharing.

Figure 2:
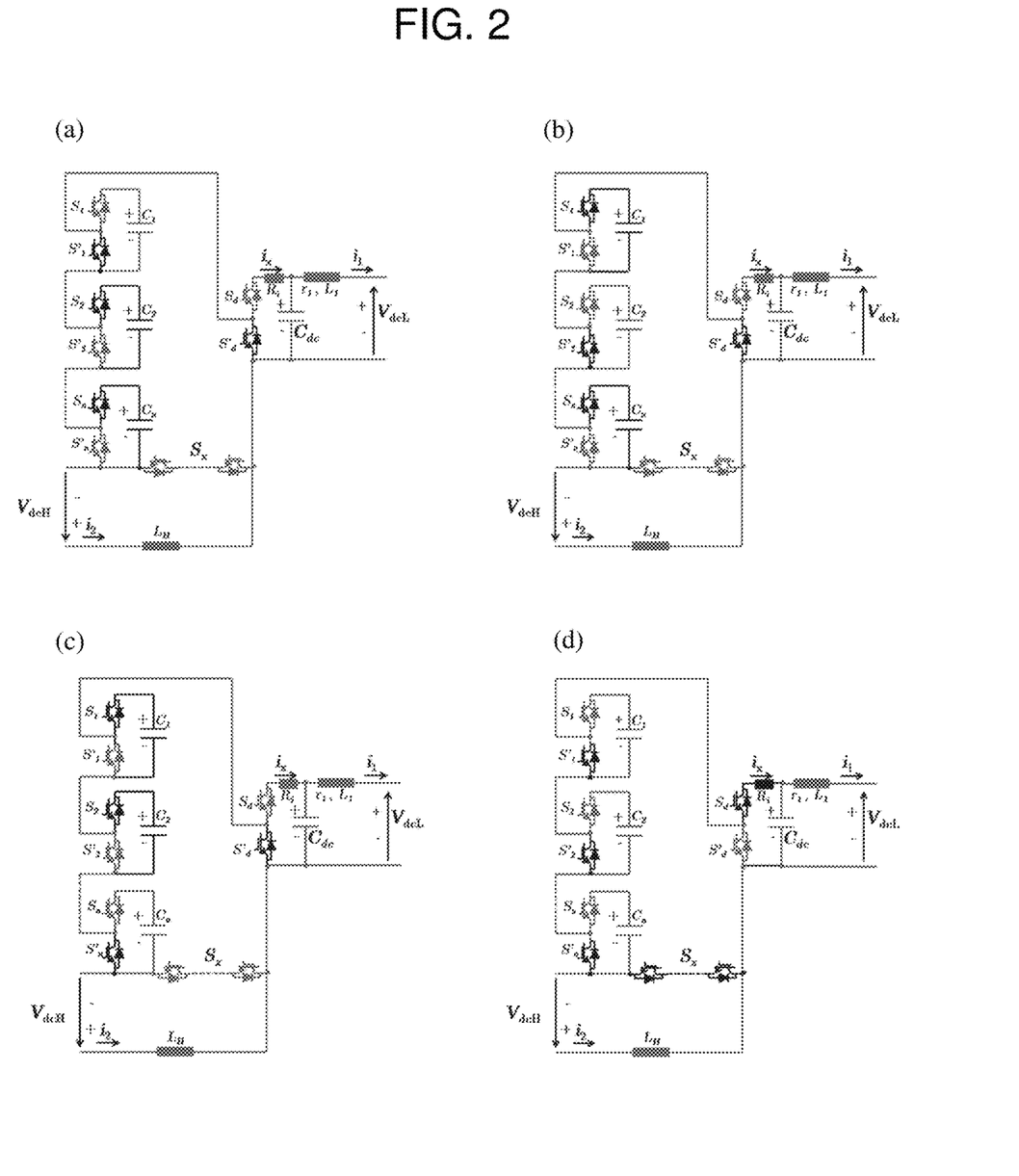
FIGS. 2(a)-(d) are illustrations of a turn-on/off period of a switch for a turn-on period, where (a) illustrates the connection of SM#1 to the LV side, (b) illustrates the connection of SM#2 to the LV side, (c) illustrates the connection of SM#n to the LV side, and (d) illustrates a turn-off period according to some embodiments.

FIG. 2 illustrates an operational concept of the converter according to some embodiments. For example, switch $S_x$ may be turned on and off with a relatively low duty cycle D and a switching period T. The proposed approach may be equivalent to operating the BC with a low duty cycle, where its input may be connected to the HV side. In some embodiments, operating with a low duty cycle may positively affect the efficiency of the BC. When the switch $S_x$ is turned on, such as in a first state, inductor $L_H$ may be connected across the HV level $V_{dcH}$, while the capacitors of HB-SMs ($C_1$ to n) may be connected sequentially (one by one) to the low DC voltage level $V_{dcL}$ via switch $S_d$, as illustrated in FIGS. 2(a)-(c). Each SM (from 1 to n) may be connected across the LV side for an equal time period of $DT_s/n$. Due to this sequential connection, the voltage of HB-SMs' capacitors in the proposed configuration may be self-balanced, i.e., no voltage/current measurement may be needed for capacitor voltage balancing.

Based on the value employed by duty cycle D, the voltage across capacitors $C_1$ to $C_n$ may be higher or lower than the voltage across capacitor $C_{dc}$ for a power flow direction from the HV side to the LV side, or from the LV side to the HV side, respectively (i.e., the proposed configuration may have the ability of bi-directional power flow between the HV side and the LV side).

In some embodiments, resistor $R_i$ may be employed to reduce the expected in-rush current results from parallel connection of the capacitor $C_{dc}$ at the LV side and the SMs' capacitances. The proper selection of the value of this resistance may limit the in-rush current with insignificant effects on the converter efficiency.

In certain embodiments, the turn-off period of $S_x$ ($D_{TS} \leq t < T$) may be the second state. In this second state, the LV side may be bypassed by turning on the switch $S'_d$, while SMs' capacitors $C_1$ to $C_n$ may be connected in series across the switch $S_x$, as illustrated in FIG. 2d. The equivalent circuit may be a conventional BC fed from the HV level $V_{dcH}$, and its output stage may be the series-connected capacitors C1 to $C_n$. Based on the power flow direction, these capacitors may be charged or discharged in this state for a power flow from the HV side to the LV side (i.e., positive $i_2$) or from the LV side to the HV side (i.e., negative $i_2$), respectively.

Based on the aforementioned operational states, current $i_x$ may be a discontinuous current, as it may have a value during a first state while it drops to zero at the second state.

To have continuous current $i_1$ at the LV side, a passive filter may be employed at the LV side, as illustrated in FIG. 1. The designs of some passive components are described below.

Figure 3:
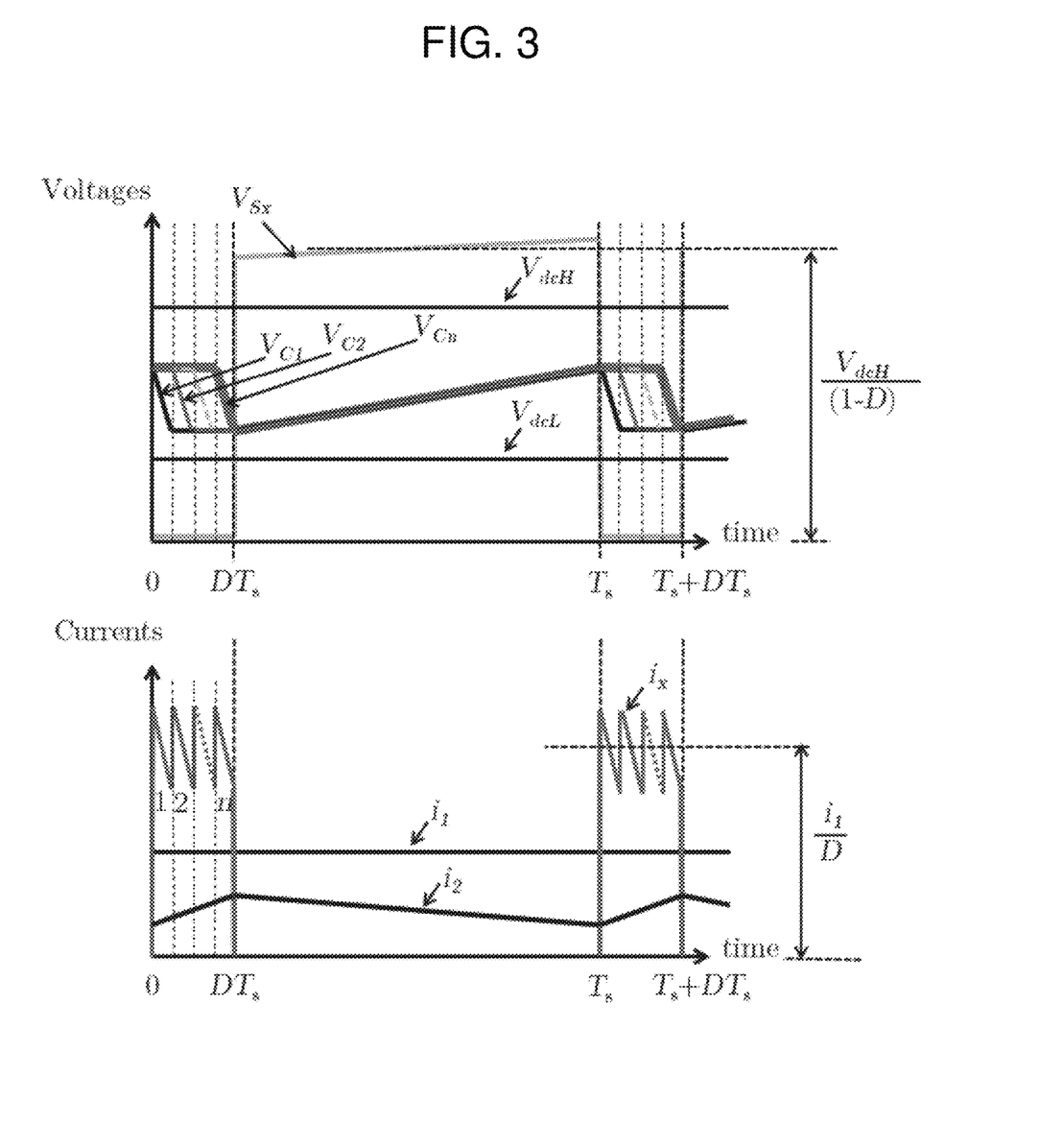
FIG. 3 is a graph of a variation of variables when power flows from a HV side to a LV side according to some embodiments.
Figure 4:
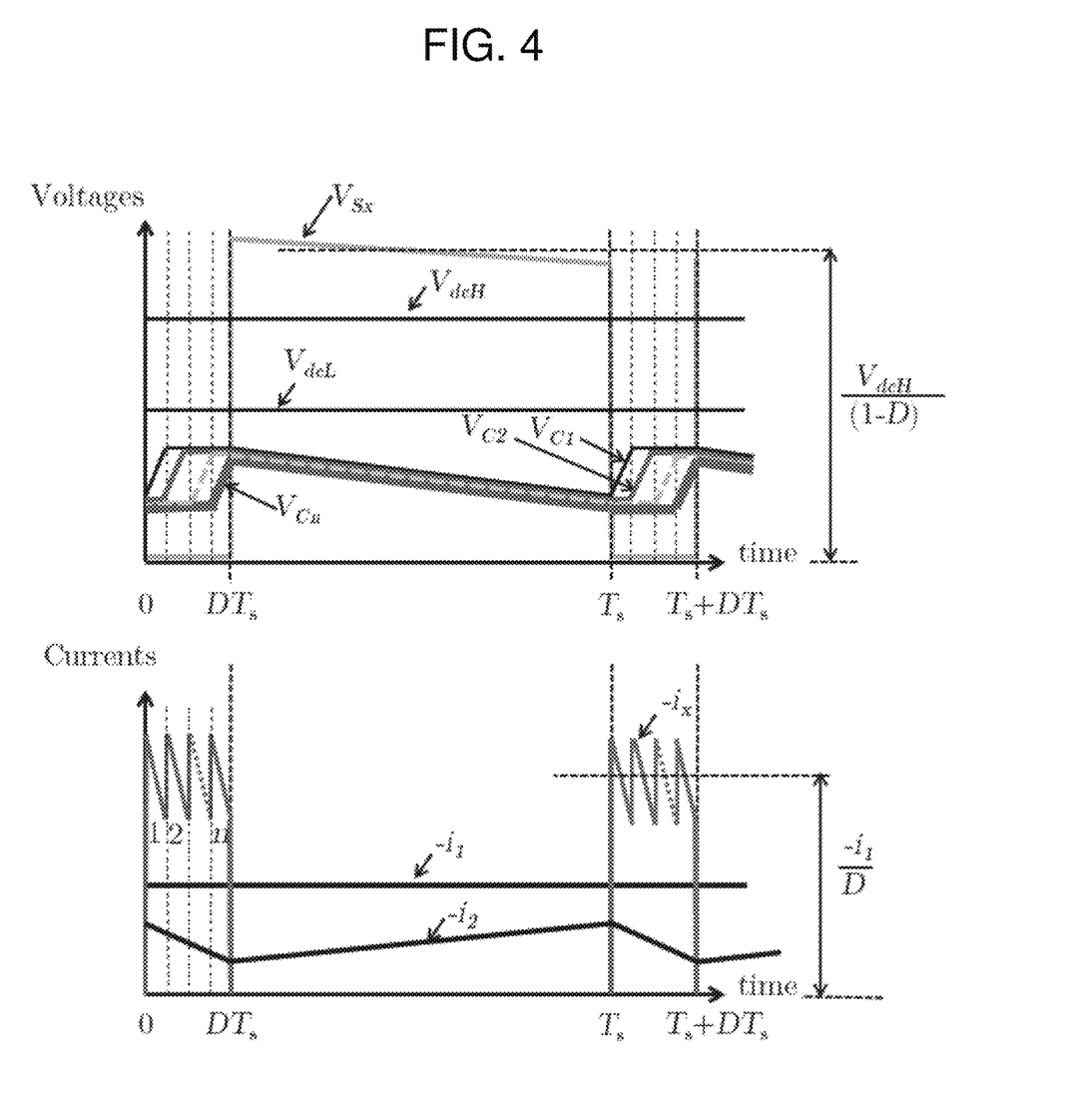
FIG. 4 is a graph of a variation of variables when power flows from a LV side to a HV side according to some embodiments.

The duty cycle of the switch $S_x$ may be controlled to control the value and the direction of the power flow. FIGS. 3 and 4 illustrate the variation of converter variables for different power flow directions.

FIG. 3 illustrates the variation of converter variables during this condition. In this case, the voltages of SMs' capacitors may be higher than the voltage of the LV side, while their sum may be higher than the HV level due to the boosting action of $L_H$ along with $S_x$, with a boosting ratio of (1/(1−D)).

During a turn-on period of $S_x$, the SMs' capacitors may be discharged sequentially to provide their energy to the LV side through the limiting resistance $R_i$. As a result, current $i_x$ may have n exponential decays. Alternatively, inductor $L_H$ may be charged from the HV side, i.e., current $i_2$ may increase linearly.

During a turn-off period of $S_x$, the SMs' capacitors may be connected in series across switch $S_x$ to replenish their voltage again by charging through inductor $L_H$. As a result, current $i_2$ may decrease, while current $i_x$ may drop to zero. The employed filter at the LV side may be designed to have current $i_1$ with a low ripple content, i.e., the average value of $i_x$ may equal $i_1$, so that the level of $i_x$ during sequential discharging may approximately equal $i_1/D$.

FIG. 4 illustrates the variation of converter variables during this condition. In this condition, the current ($i_1$, $i_2$, and $i_x$) may be negative, and voltages of SMs' capacitors may be lower than the voltage of the LV side, while their sum may still be higher than the HV side due to the boosting action of the BC.

During a turn-on period of $S_x$, the SMs' capacitors may be charged sequentially from the LV side through the limiting resistance $R_i$. As a result, current $i_x$ may have n exponential decays. Alternatively, the inductor $L_H$ may discharge in the HV side, i.e., the current may decrease. In another embodiment, during a turn-off period of $S_x$, the SMs' capacitors may be connected in series across the switch $S_x$ to start charging the inductor $L_H$. As a result, the inductor current may increase, while current $i_x$ may drop to zero.

For the given voltage and current directions in FIG. 1, the following relations may be extracted at steady state:

$$V_{Cdc} = V_{dcL} + r_1 i_1 \quad (1)$$

$$i_{x_1} = \frac{V_{CSM} - V_{Cdc}}{R_i} \quad (2)$$

where $r_1$ may be the internal resistance of inductance $L_1$, as illustrated in FIG. 1, and where $i_{x_j}$ may be the average value of current $i_x$ during a sequential charging/discharging period. Finally, $V_{CSM}$ may be the voltage of SM capacitor, which is given by:

$$V_{CSM} = \frac{V_{cdH}}{n(1-D)} \quad (3)$$

Equation 3 may be applied where the SMs' capacitances are series-connected across a BC output stage during a second state of operation.

By assuming that the involved capacitors are large enough, current $i_x$ during the sequential charging/discharging period may be considered as a constant at ($i_1/D$) level with insignificant current ripples. Based on that, Equation 2 may be rewritten as Equation 4:

$$i_1 = \frac{D}{(Dr_1 + R_i)}\left[\left(\frac{V_{dcH}}{n(1-D)}\right) - V_{dcL}\right] \quad (4)$$

Equation 4 describes the relation between the current at the LV side and the duty cycle of switch $S_x$.

Based on Equation 4, the current may be zero when duty cycle D equals critical duty cycle $D_{cr}$, where the critical duty cycle may be given by:

$$D_{cr} = 1 - \frac{V_{dcH}}{nV_{dcL}} \quad (5)$$

If $D > D_{cr}$, current $i_1$ may be positive, i.e., the power flow may be from the HV side to the LV side. Alternatively, if D<$D_{cr}$, current $i_1$ may be negative, i.e., the power flow may be from the LV side to the HV side.

Based on Equation 5, the number of HB-SMs (n) may be selected for particular voltage levels to ensure operation within a certain range of the duty cycle.

Figure 5:
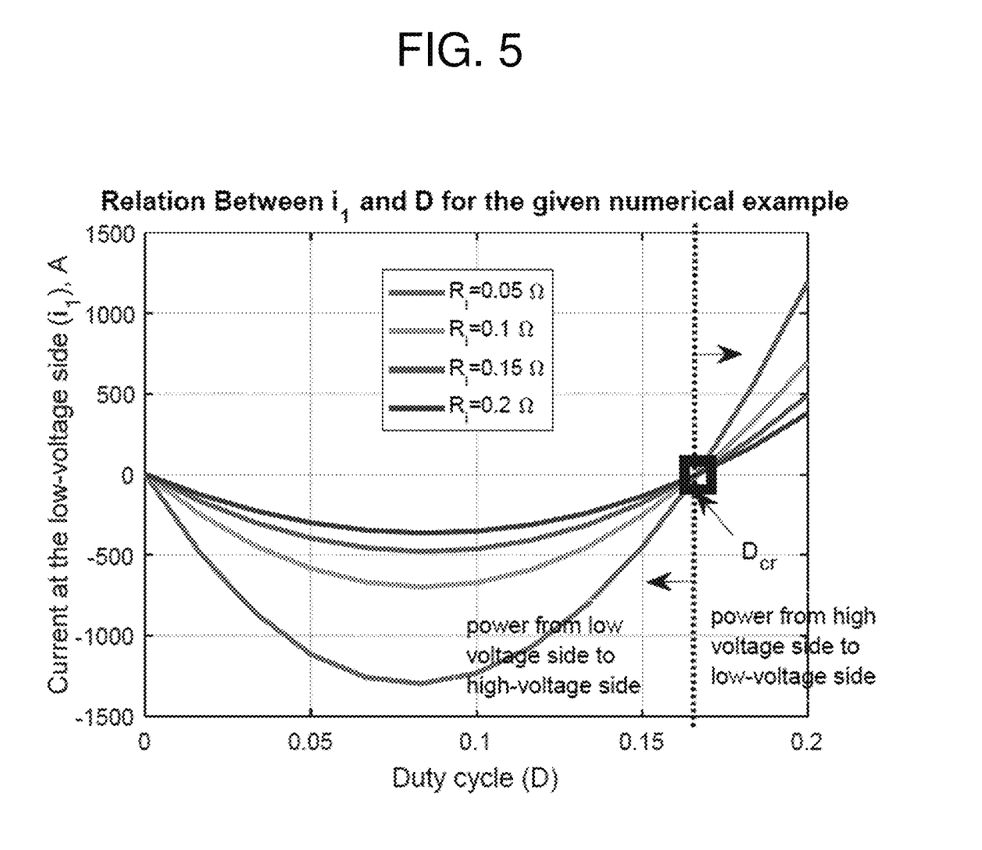
FIG. 5 is a graph of the effects of duty cycle on the power flow direction for a given numerical example according to some embodiments.

As an example, FIG. 5 illustrates the relationship between current $i_1$ and duty cycle D for different values of $R_i$, assuming $V_{dcH}$=25 kV, $V_{dcL}$, =10 kV, n=3 (i.e., $D_{cr}$=0.167), and $r_1$=0.1Ω.

FIG. 5 illustrates that the value of limiting resistance $R_i$ may affect the maximum/reachable value of current $i_1$ when the power flow is from the LV side to the HV side. As the value of $R_i$ decreases, the reachable current increases, but alternatively, the peak of in-rush current during sequential charging/discharging period may increase. To ensure operation with an acceptable in-rush current peak, and with the desired power rating, a proper design for the value of $R_i$ may be considered.

With respect to the design of the passive components of the converter, the second state of the operation, as illustrated in FIG. 2d, may be considered as a bidirectional BC with input voltage of $V_{dcH}$ and output voltage of $nV_{CSM}$, where n may be the number of HB-SMs, and $V_{CSM}$ may be the voltage of each SM capacitor. Based on BC basics, the relationship between the capacitor voltages and the high DC voltage levels may be given by Equation 3. By controlling the duty cycle D, the voltage of SMs' capacitors may be controlled to be higher or lower than the voltage of the LV side, which may result in transferring the power from/to the HV side to/from the LV side, respectively.

Based on BC basics, inductor $L_H$ may be selected such that:

$$L_H = \frac{V_{dcH}D}{\Delta I f_s} = \frac{V_{dcH}DT_s}{\Delta I} \quad (6)$$

where $f_s$=(1/$T_S$) may be the switching frequency of an employed saw-tooth carrier, and ΔI may be the current peak-to-peak ripple magnitude. Based on the desired current ripple magnitude, suitable inductance at the HV side may be selected.

Alternatively, the SMs' capacitances may be connected in series across an output stage of the BC. If the capacitance of each SM is $C_i$, their equivalent capacitance may be $C_i/n$, which may be considered as the BC load in the second state. Based on that, Equation 7 may be used to choose the proper value of SMs' capacitances:

$$C_i = \frac{nI_2 D}{\Delta V_{smfs}} = \frac{nI_2 DT_s}{\Delta V_{SM}} \quad (7)$$

where $\Delta V_{SM}$ may be the ripple voltage of the SMs' capacitors, while $I_2$ may be the rated current of current $i_2$. The capacitance may be chosen to ensure an insignificant voltage ripple. The constraint governing the value of capacitor voltage ripple is discussed in Equation 19, as discussed below.

With respect to the limiting resistance $R_i$, it may be selected to ensure an acceptable in-rush current peak when $C_{dc}$ is connected in parallel with the HB-SMs' capacitances during the sequential charging/discharging period. In some embodiments, the power flow may be from the HV side to the LV side, and peak of current $i_x$ during the sequential charging/discharging period may be limited to ($I_{pk}$=(1+β)$i_1$/D), as illustrated in FIG. 6a, where β may be less than unity. Based on Equation 4, the approximate equation of the peak current in terms of circuit variables may be given by:

$$I_{pk} = \frac{(1+\beta)i_1}{D} = \frac{\left(\frac{V_{dcH}}{n(1-D)}\right) - (V_{dcL} + i_1 r_1)}{R_i} \quad (8a)$$

For a given current $i_1$, Equation 8b, illustrated as a line in FIG. 6b, may describe the relation between Ri and D as:

$$R_i = D \frac{\left(\frac{V_{dcH}}{n(1-D)}\right) - V_{dcL} - i_1 r_1}{(1+\beta)i_1} \quad (8b)$$

The value of resistance $R_i$ may be chosen such that the power dissipated in it is insignificant when compared with the power at the LV side to ensure high efficiency operation.

The average power of resistor $R_i$ may be approximated by:

$$P_{R_i} = \frac{R_i}{D} i_1^2 \quad (9)$$

while the power at the LV side may be given by:

$$P_{LVS} = i_1 V_{dcL} \quad (10)$$

Using Equation 9 and Equation 10, Equation 11, illustrated as a line in FIG. 6b, may be used to obtain the proper value:

$$R_i = \frac{\alpha D V_{dcL}}{i_1} \quad (11)$$

where α may be the desired ratio between the power dissipated in the resistor $R_i$ to the power at the LV side, such as in Equation 12:

$$\alpha = \frac{P_{R_i}}{P_{LVS}} \quad (12)$$

By plotting Equation 8b and Equation 11, the intersection point may determine a suitable value of $R_i$ as well as a nominal value of the duty cycle for the given desired current level $i_1$.

For example, if $V_{dcH}$=25 kV, $V_{dcL}$=10 kV, n=3 (i.e., $D_{cr}$=0.167), $i_1$=+250 A (i.e., power flow may be from the HV side to the LV side), $r_1$=0.01Ω, β=0.5, and α=0.005, the graphical representation for Equation 8b and Equation 11 is illustrated in FIG. 6b. The suitable value of $R_i$ may be 0.035Ω, accordingly. The corresponding duty cycle may equal 0.173 (D>$D_{cr}$), i.e., $I_{pk}$=2170 A.

With respect to the capacitance at the LV side, for example, $C_{dc}$, it may be selected properly to ensure that the current at the end of each exponential decay in the sequential charging/discharging period is limited to ((1−β)$i_1$/D) as illustrated in FIG. 6a. When one of the SM capacitances, such as $C_i$, is connected to capacitance $C_{dc}$ through resistor $R_i$ during a sequential charging/discharging period, their equivalent capacitance in this loop may be calculated by Equation 13:

$$C_{eq} = \frac{1}{\frac{1}{c_i} + \frac{1}{c_{dc}}} \quad (13)$$

Figure 6:
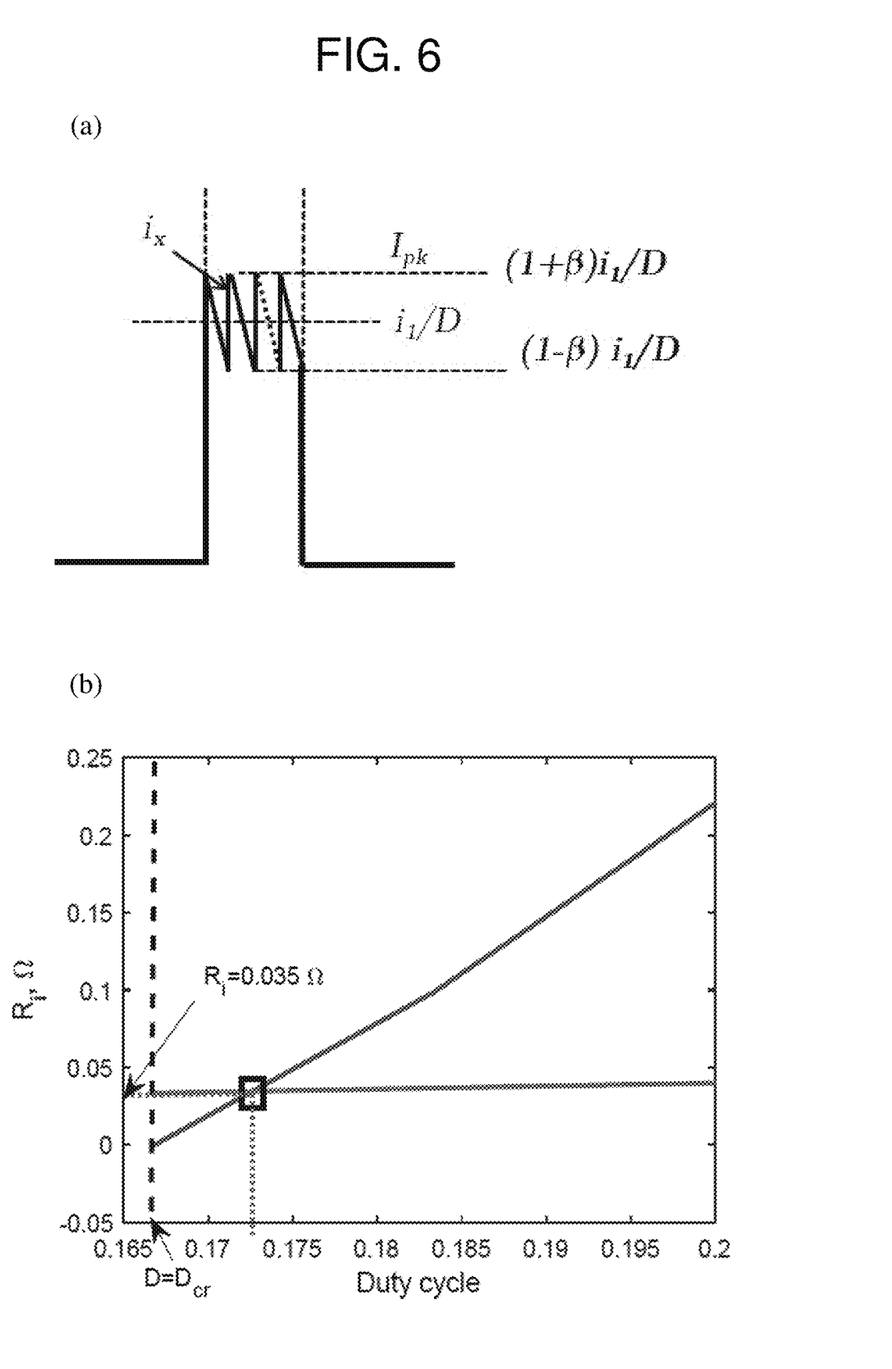
FIGS. 6(a)-(b) are illustrations of resistor $R_i$, where (a) illustrates a range of current $i_x$ during a sequential charging/discharging period, and (b) illustrates a graphical representation for $R_i$ equations according to some embodiments.

Based on FIG. 6, each exponential decay of $i_x$ may be expressed using Equation 14:

$$i_{decay} = I_{pk}e^{\frac{-\tau}{T}} = (1+\beta)\left(\frac{i_1}{D}\right)e^{\frac{-\tau}{T}} \quad (14)$$

where $\tau$ may be the equivalent time constant, which may equal $R_i C_{eq}$. The sequential charging/discharging may occur during time period $DT_s$, which may be equally divided among the SMs, i.e., time period of each SM may be equal to $DT_s/n$.

Based on Equation 14, at the end of the exponential decay, Equation 15 may be written as:

$$(1-\beta)\frac{i_1}{d} = (1+\beta)\left(\frac{i_1}{D}\right)e^{\frac{-DT_s}{nR_iC_{eq}}} \quad (15)$$

i.e., the equivalent capacitance may be given by:

$$C_{eq} = \frac{DT_s}{nR_i \ln\frac{1+\beta}{1-\beta}} \quad (16)$$

Based upon Equation 13 and Equation 16, the capacitance $C_{dc}$ may be calculated by Equation 17:

$$C_{dc} = \frac{1}{\left(\frac{nR_i}{DT_s}\ln\frac{1+\beta}{1-\beta}\right) - \frac{1}{c_i}} \quad (17)$$

Based on Equation 17, the capacitance $C_i$ may satisfy Condition 18:

$$C_i > \frac{1}{\frac{nR_i}{DT_s}\ln\frac{1+\beta}{1-\beta}} \quad (18)$$

Based on Equation 7 and Equation 17, the capacitor voltage ripples for SMs' capacitors should satisfy Condition 19:

$$\Delta V_{SM} < n^2 I_2 R_i \ln\frac{1+\beta}{1-\beta} \quad (19)$$

Finally, $L_1$ may be selected such that the current due to BC switching frequency $f_s$ is dampened at the LV side. To accomplish this, $L_1$ may be selected such that the resonance between $L_1$ and capacitance $C_{dc}$ may occur at frequency $f_r$, which may be lower and distinct from the BC switching frequency, for example, $f_r = f_s/10$. Thus, inductance $L_1$ may given by:

$$L_1 < \frac{1}{(2\pi f_r)^2 c_{dc}} \quad (20)$$

The HB-SM switches may be clamped on the capacitor voltage level. Since the capacitor voltage may be higher or lower than the voltage of the LV side, such as according to the power flow direction, the design may be on the worst case, i.e., when the power flow is from the HV side to the LV side at the rated condition, where the voltage rating of each switch in the HB-SM may be higher than $(V_{dcH}/(1-D_{HL}))/n$, where $D_{HL}$ may be the duty cycle. If this voltage rating is available, a single Insulated Gate Bipolar Transistor (IGBT) may be employed for each switch in the HB-SMs. If not, each switch in the HB-SMs may be implemented by connecting a proper number of IGBTs in series with proper voltage sharing.

The involved switches in HB-SMs may have a high-pulsed current rating, as they may experience relatively high currents during the sequential connection of SMs to the LV side with a peak of $(1+\beta)i_1/D$. As the duty cycle in case of power flow from the LV side to the HV side may be lower than the duty cycle in the other direction of the power flow, the design of switch current ratings may be based on the power flow from the LV side to the HV side, i.e., the pulsed current rating may higher than $(1+\beta)i_1/D_{LH}$ for time $D_{LH}T_s$ at the rated condition, where $D_{LH}$ may be the duty cycle when the power flow is from the LV side to the HV side.

In some embodiments, the high in-rush current may not pass through the lower switch in the HB-SM at the LV side, as it may carry current 12 during the second state (FIG. 2d) while it equals zero in the first state (FIGS. 2(a)-(c)).

The switch $S_x$ may implemented as a series-connection of a certain number of IGBTs (i.e., h); as a result, the voltage rating of each IGBT may be higher than $(V_{dcH}/(1-D_{HL}))/h$.

With respect to the current rating, the switch $S_x$ may carry the sum of two currents during the first state (FIGS. 2(a)-(c)), namely, current 12 as well as current $i_x$, while the current of switch $S_x$ may drop to zero during the second state (FIG. 2d). Based on that, the involved IGBTs in the switch $S_x$ may have a high pulse current rating, which may be higher than $(i_2+((1+\beta)i_1/D_{LH}))$ for time $D_{LH}T_s$ at the rated condition.

In certain embodiments, in order to reduce the pulsed current rating of the involved IGBTs, parallel modules for switches with high-pulsed current rating may be employed.

Figure 7:
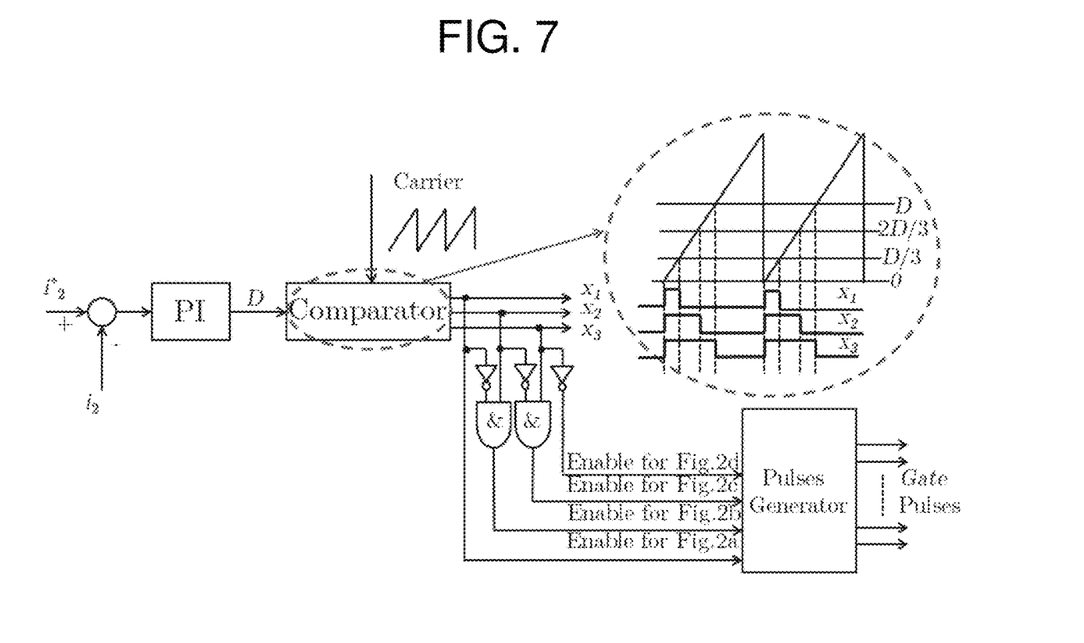
FIG. 7 is a schematic illustration of a controller of an architecture assuming n=3 according to some embodiments.

The closed loop controller for the proposed approach is illustrated in FIG. 7. The current of the HV side $i_2$ may be measured and compared with its reference $i_{2_{ref}}$, where the error signal may be provided to a conventional PI controller to generate the suitable duty cycle D. To ensure a successful sequential charging/discharging of capacitors, the extracted duty cycle may be provided to a sequential operation block to generate suitable gate pulses for the involved switches. The details of sequential operation block are illustrated in FIG. 7, assuming n=3.

A simulation model may be built for the proposed configuration, assuming a 2.5 MW (25 kV/10 kV) DC-DC transformer is used. The design steps are summarized below.

Based on Equation 5 above, the critical duty cycle may equal 0.167 assuming n=3.

For a rated power of 2.5 MW, the current at the LV side $i_1$ may approximately equal +250 A (assuming the power flow is from the HV side to the LV side), $r_1$=0.01, $\beta$=0.5, and a=0.005, based on FIG. 6b. In addition, the suitable value of $R_i$ may be 0.035Ω, while the nominal duty cycle for the given current level may be 0.173. As a result, the peak of current $i_x$ may be around 2170 A.

Based on Equation 6, the inductance at the HV side may be selected for a desired peak-peak ripple current magnitude ΔI. For a peak-to-peak current ripple magnitude of less than 40 A (i.e., 40%), an inductance of 0.12 H may be employed, assuming a switching frequency of 1 kHz.

Based on Equation 19, the peak-to-peak voltage ripple of the SMs' capacitors may be less than 34V. For a voltage ripples magnitude of 30V, using Equation 7, the suitable SM capacitance may equal approximately 1.73 mF, where $I_2 \approx 100$ A.

Based on Equation 17, the suitable capacitance at the LV side, $C_{dc}$, may equal 11 mF.

Finally, based on Equation 20, the inductance at the LV side $L_1$ may equal 0.23 mH for a resonance frequency of 100 Hz. An internal resistance $r_1$ of 0.01Ω may be assumed for $L_1$.

Figure 8:
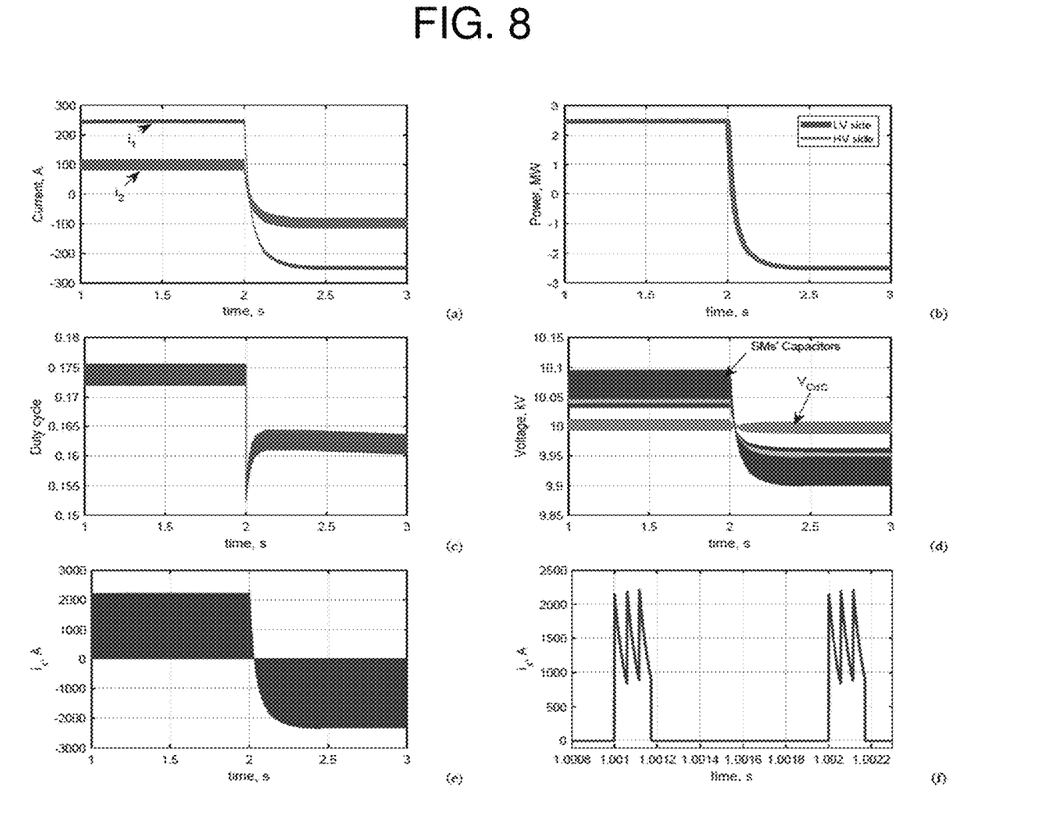
FIGS. 8(a)-(f) are illustrations of simulation results, where (a) illustrates a range of current $i_x$ during sequential charging/discharging periods, (b) illustrates powers at the HV side and the LV side, (c) illustrates duty cycles of the BC, (d) illustrates voltages of SMs' capacitors and $C_{dc}$, (e) illustrates the current passing through the resistor $R_i$, and (f) illustrates a zoomed-in version according to some embodiments.

The aforementioned extracted values may be defined in the model. The current at the HV side may be controlled to be 100 A for 0≤t<2 s, then −100 A for 2 s≤t<3 s. A conventional PI-based current controller may be employed with constants ($k_p$=1×10$^{-4}$ and $k_i$=1×10$^{-3}$) to generate the suitable duty cycle. The duty cycle may then be sent to the sequential operation control block, as illustrated in FIG. 7b, to generate the gate pulses of all involved switches. The corresponding simulation results are illustrated in FIG. 8.

FIG. 8a illustrates the current at the HV side, as well as the LV side. The currents may be regulated in both directions, and the peak-to-peak current ripple magnitude at the HV side may be limited to the defined value.

FIG. 8b illustrates the average powers at both sides, where the average power of the HV side may be higher for 0≤t<2 s, as the power may be transferred from the HV side to the LV side. Alternatively, the average power at the LV side may be higher for 2 s<t<3 s as the power flow is reversed.

FIG. 8c illustrates the operational duty cycle. The duty cycle may be higher than the critical one when the power flow is from the HV side to the LV side and vice versa, which is described in the analysis section above. The duty cycle value may apply to both directions of power flow, which may be relatively low, guaranteeing efficient operation of the BC.

FIG. 8d illustrates the voltages of the involved capacitors, SMs' capacitors and $C_{dc}$. The voltages of SMs' capacitors may be self-balanced in both directions, and their ripples may be limited to the defined value. The configuration may provide self-balancing for SMs' capacitors with no need for any measurement or sorting/calculation burdens on the controller. Based on FIG. 8d, the voltage of $C_{dc}$ may almost be fixed at the LV side voltage level, while the voltage level of SMs' capacitors may depend on the power flow direction, i.e., operating duty cycle. In some embodiments, power may flow from the HV side to the LV side, and the voltage of SMs' capacitors may be higher than the voltage of the LV side and vice versa, validating the aforementioned analysis and illustrations.

Finally, FIGS. 8e and 8f illustrate current $i_x$, which may be discontinuous and have three exponential decays during the sequential connection period (i.e., n=3). In certain embodiments, the limits of exponential decays may be bounded close to the defined range. Current $i_x$ may be higher when the power flow is from the LV side to the HV side because the operating duty cycle in this condition may be lower. The presented simulation results may provide validation and extracted mathematical relationships, which may govern the behavior of the proposed hybrid modular DC-DC converter.

The bi-directional, hybrid, modular non-isolated DC-DC converter may be effectively used in connecting two different DC voltage levels in medium- to high-voltage DC grids. The capacitors of involved HB-SMs in the proposed configurations may be self-balancing, with no need for any voltage/current measurement for capacitor voltage balancing issues. The suggested approach may ensure operating the boost converter under low duty cycle efficiently. The value of duty cycle may be the key for controlling the power flow direction, where if the duty cycle is higher than the critical value, the power flow may be from the HV side to the LV side and vice versa. The critical duty cycle may depend on the HV and LV levels, as well as a number of employed HB-SMs. All governing equations have been provided for a better explanation of the converter operational concept, as well as a full design of the converter components. A closed loop controller for the suggested architecture is also proposed. The closed loop controller may be used where the current at the HV side controls the power demand and direction. Finally, simulation results have been provided to validate the design equations and the proposed concepts.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations that are different from those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

AC Alternating Current
DC Direct Current
HB-SM Half-bridge Sub-module
HV High Voltage
IGBT Insulated Gate Bipolar Transistor
LV Low Voltage
PI Proportional Integral
SM Sub-module

We claim:
1. An electrical converter, comprising:
a first half-bridge sub-module;
a switch; and a first capacitor, wherein:
  the half-bridge sub-module is connected to the first capacitor, and the switch is connected to a terminal of the first half-bridge sub-module,
  the switch includes a plurality of insulated-gate bipolar transistors, and
  the switch is configured to carry a sum of two currents during a first state, or a passive filter on a low voltage side is configured to provide a continuous current at the low voltage side.

2. The electrical converter of claim 1, wherein the insulated-gate bipolar transistors are serially connected with each other.

3. The electrical converter of claim 1, further comprising a plurality of cascaded half-bridge sub-modules.

4. The electrical converter of claim 3, wherein the cascaded half-bridge sub-modules are connected in series across the switch.

5. The electrical converter of claim 3, wherein at least one of the cascaded half-bridge sub-modules is coupled with a second capacitor.

6. The electrical converter of claim 1, wherein the switch is a high voltage switch.

7. The electrical converter of claim 1, wherein the first half-bridge sub-module is connected with the first capacitor via a resistor.

8. The electrical converter of claim 1, wherein the electrical converter is a DC-DC converter.

9. The electrical converter of claim 1, wherein the electrical converter is configured to be operated with a low duty cycle.

10. The electrical converter of claim 1, wherein the switch has a high-pulsed current rating.

11. The electrical converter of claim 10, wherein the switch current rating is based on the power flow from a LV side to a HV side.

12. The electrical converter of claim 1, wherein parallel modules for switches with high-pulsed current ratings are employed.

13. The electrical converter of claim 1, wherein an extracted duty cycle is provided to a sequential operation block to generate suitable gate pulses for the involved switches.

14. The electrical converter of claim 1, wherein the current of the HV side is measured and compared with a reference.

15. The electrical converter of claim 14, wherein the error signal is provided to a conventional proportional integral controller to generate the suitable duty cycle D.

16. The electrical converter of claim 1, wherein a second state of the operation has an input voltage of and an output voltage.

17. The electrical converter of claim 1, wherein the voltage of capacitor is controlled to be higher or lower than the voltage of a low voltage side.

* * * * *